C. W. WHALAND.
SPRING WHEEL.
APPLICATION FILED OCT. 23, 1913.
1,099,728.
Patented June 9, 1914.
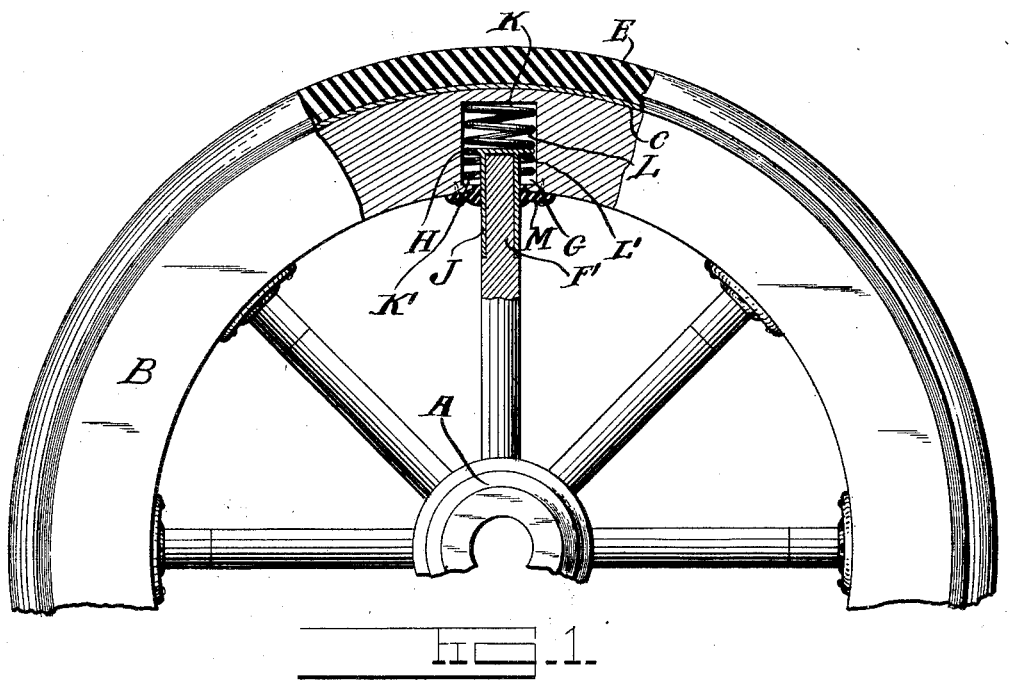
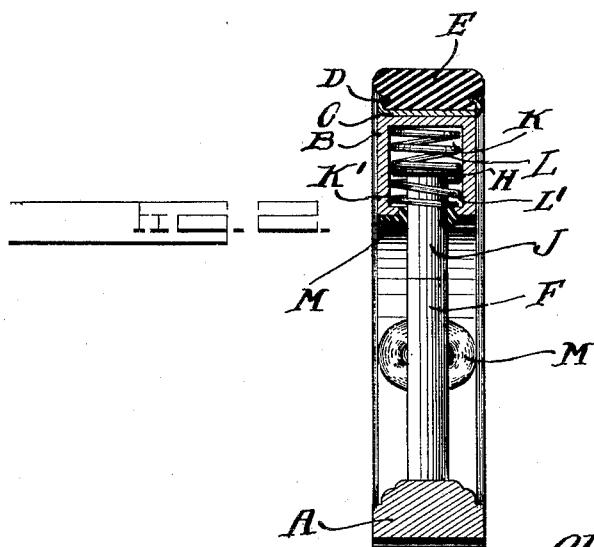
Charles W. Whaland,
Inventor

UNITED STATES PATENT OFFICE.

CHARLES WICKES WHALAND, OF CHESTERTOWN, MARYLAND.

SPRING-WHEEL.

1,099,728.  Specification of Letters Patent.  Patented June 9, 1914.

Application filed October 23, 1913. Serial No. 796,852.

*To all whom it may concern:*

Be it known that I, CHARLES W. WHALAND, a citizen of the United States, residing at Chestertown, in the county of Kent and State of Maryland, have invented certain new and useful Improvements in Spring-Wheels, of which the following is a specification.

My invention relates to improvements in spring wheels and refers particularly to a wheel for use upon automobiles and other vehicles, the main object of the invention being the provision of a wheel which will have the same elastic properties as the pneumatic wheel, but which will have a much longer life and be capable of production and maintenance at a much smaller cost than the pneumatic wheel.

Another object of my invention is the provision of a vehicle wheel capable of use in connection with wheels employing either a wood or a metal rim, which improvements may be applied to wheels at the time of manufacture or upon wheels in use, which will properly distribute the strain and wear to all parts of the wheel, which will withstand the hardest kind of usage, and which generally, from every point of view, will be thoroughly efficient and practical.

With these objects in view, my invention consists of a vehicle wheel embodying novel features of construction and combination of parts for service, substantially as disclosed herein.

In order that the construction in detail and the advantages of my invention may be fully understood and appreciated, I have illustrated in the accompanying drawing a vehicle wheel embodying my invention, it being understood that I reserve the right to make such changes in the construction as fall within the scope of my claims.

Figure 1 represents a side elevation of a portion of a spring wheel constructed in accordance with my invention, partly broken away to clearly show details of construction. Fig. 2 represents a transverse sectional view.

The wheel in general consists of the hub A, rim B of wood or metal, tire carrying metal rim C, which may be formed with confining flanges D, to retain the outer elastic or cushion tire E, and the series of spokes F.

The rim, at proper intervals, is provided with compartments or cavities G, in which fit the plates H, carried by the sleeves or thimbles J, which fit upon the outer end of the spokes F, said spokes being shouldered and reduced in size, as at F', to properly fit the sleeves. This construction provides an upper space K, in which is received the springs L, and a lower space K', in which is received the springs L', the purpose being to have the spokes provided with a cushion action, both on the upper and under side of the contact plates carried by the ends of the spokes, which is highly essential in producing the desired and necessary results. To prevent the entrance of dust, moisture or foreign matter to the springs, I provide the elastic rings M, which surround the metal sleeves on the spokes and form a closure to prevent the entrance of foreign matter, as will be readily understood. It will thus be seen that I provide a wheel which has an elastic contact with the surface or ground, and that the arrangement of the pairs of springs places in the rim of the wheel the proper spring or cushion action to give the wheel all the properties of a pneumatic wheel, and at a much smaller cost.

The improvements can be readily applied to wheels using either wood or metal rims, also the outer rim may be made of any desired shape to hold the outer rubber tire with flanges or with the construction in general use, or the improvements may be applied to the wheels when made or to wheels in use, and that the construction will insure an efficient and practical vehicle wheel which will fill the requirements of the expensive pneumatic tire wheels.

I claim:

1. The vehicle wheel herein described, consisting of the rim, hub and spokes, said rim being formed with a series of spoke-openings leading to enlarged cavities, sleeves fitting the ends of the spokes and formed with a flange dividing the cavities into an upper and lower space, springs disposed in said spaces in pairs, and elastic rings having their outer flat broad portion secured to the wheel rim and having an upper portion forming a plug and closing the space around the spoke caps and openings and fitting snugly against the said sleeves to prevent entrance of foreign matter to the cavities and springs.

2. In combination with the rim having the spoke openings and enlarged cavities communicating therewith, the spokes, the sleeves on said spokes having a flanged top, the springs above and below said flanged top, the elastic rings having their outer portion secured to the rim, their inner face bearing against the sleeves and having a portion forming a plug to close the spoke openings.

In testimony whereof I affix my signature in presence of two witnesses.

CHARLES WICKES WHALAND.

Witnesses:
MERRICK CLEMENTS,
WILLIAM W. BECK.

Copies of this patent may be obtained for five cents each, by addressing the "Commissioner of Patents, Washington, D. C."